United States Patent Office 3,544,346
Patented Dec. 1, 1970

3,544,346
PAINTS AND PAINT COMPOSITIONS
Hussein Shimi, Alcantara 33,
Madrid 6, Spain
No Drawing. Filed Nov. 2, 1967, Ser. No. 680,049
Claims priority, application Great Britain, Jan. 20, 1967,
3,219/67
Int. Cl. C09c 1/00, 1/36
U.S. Cl. 106—299                                1 Claim

ABSTRACT OF THE DISCLOSURE

A paint pigment composition for use in paint manufacture, particularly the manufacture of corrosion-inhibiting priming paints for iron and steel, contains a mixture of the ores ilmenite and chromite in the "as mined" state. The operable ratio for the ores is from 0.5% to 99.5% by weight of ilmenite and, correspondingly, from 99.5% to 0.5% by weight of chromite, these percentages being based on the total weight of ilmenite plus chromite. Paints formed from the pigment by mixture with a paint vehicle, and, optionally, also a paint extender, a paint suspending agent, a paint thinner and/or a paint drier, exhibits superior corrosion inhibiting properties compared with conventional red lead priming paints.

---

This invention relates to paints and pigment-containing compositions for the use in paint manufacture. More particularly, although not exclusively, the invention is concerned with a paint suitable for use as a primer for iron and steel, and with pigment-containing compositions suitable for the manufacture of such primers.

The best known pigment for iron and steel priming paints is red lead, and whilst in recent years primers for iron and steel which contain other corrosion-inhibiting pigments have been developed, probably red lead is still the most widely used pigment for this purpose.

We have now discovered that mixtures of the two mineral ores ilmenite and chromite formed simply by mixing the two ores as they occur in nature without resorting to any chemical processing or refining other than grinding to a suitable particle size, are as satisfactory as, if not better than, red lead for use as the corrosion-inhibiting pigment in iron and steel priming paints, whilst being abundant in nature and available at substantially lower cost than red lead. Ilmenite consists essentially of titanium dioxide ($TiO_2$) and the iron oxides FeO and $Fe_2O_3$, whilst chromite consists essentially of chromic oxide ($Cr_2O_3$) and the iron oxide FeO.

Thus, in accordance with one aspect the present invention provides a paint, particularly a paint suitable for use as a primer for iron and steel, comprising a paint vehicle and a corrosion-inhibiting pigment consisting of a mixture of from 0.5%–99.5% by weight of ilmenite and from 99.5%–0.5% by weight of chromite.

In accordance with a further aspect the present invention provides a composition suitable for admixture with a paint vehicle for the production of paint, particularly an iron and steel priming paint, and comprising a mixture of from 0.5–99.5% by weight of ilmenite and from 99.5%–0.5% by weight of chromite, possibly also with a paint extender (filler) and/or a paint suspending agent.

Although enhanced corrosion resistance is obtainable with ilmenite/chromite mixtures containing as little as 0.5% by weight of one or other of these two minerals, it is preferred that there should be at least 5% by weight of ilmenite or chromite in the pigment mixture, whilst best results are obtained when the pigment mixture contains from 25%–75% by weight of one of the minerals and correspondingly, from 75% to 25% by weight of the other mineral. Really outstanding corrosion resistance has been observed in tests conducted with primers containing equal amounts by weight of the two minerals in the pigment mixture. It was certainly not to be expected that this enhanced corrosion resistance could be obtained by simply mixing the two minerals ilmenite and chromite in the raw i.e. "as mined" state.

Another advantage of the ilmenite/chromite pigment of this invention compared with read lead is its non-toxic nature, whereas red lead powder required careful handling because of its toxicity. Yet another advantage of ilmenite/chromite pigment compared with red lead is that, due to the difference in specific gravity between the two materials, ilmenite/chromite pigment covers approximately 95% more surface area than the same weight of red lead. Further, ilmenite/chromite-containing paints have been made which spread more evenly and smoothly than conventional red lead primers.

As already noted, the use of ilmenite/chromite as a paint pigment does not require either special manufacturing techniques or compounding ingredients other than those conventionally employed. Thus the ilmenite/chromite which is used as mined may be crushed and ground to the required particle size for use as paint pigment (suitably 300 mesh or smaller), in either a conventional pulverizing apparatus or in micronizer mills, and then either mixed with extenders and/or suspending agents for subsequent formulation into paints or, and more usually, formulated directly with a paint vehicle for the production of a paint.

Suitable vehicles of the convertible type for use in the production of (ilmenite/chromite)-containing paints include drying oils, for example linseed, soya, tung and oiticica oils, dehydrated castor oil, stand oils, boiled oils, and blown oils; processed oils, for example malenized and styrenated oils: varnishes, for example of the copal oil type, modified phenolic oil types, modified maleic oil type and 100 percent phenolic tung oil types, and synthetic vehicles phenol-formaldehyde resins, urea formaldehyde alkyds, epoxide esters, epoxide phenolic blends, epoxide polyamide remain blends, and polyurethanes.

Although not essential, the use of an extender in the paint compositions of this invention is contemplated. Examples of suitable extenders are alumina hydrates, asbestine, barytes, blanc fixe, chalk, china clay, gypsum, infusorial earth, magnesium carbonate, marble dust, mica, pumice, silica, talc and whiting.

It is also preferred to include a suspending agent in the paint formulations of this invention, although even without such agents there is little tendency for the ilmenite/chromite pigment to cake at the bottom of containers on storage. Suitable suspending agents, which may be used in conventional amounts, e.g. from 4–15% by weight of the total weight of the paint, include asbestine (which also serves the function of extender), bentonite, mica, sulphonated dioctyl esters of succinic acid, cetyltrimethyl ammonium bromide, oleic acid, turkey red oil, soya bean lecithin, glycerol boriborate, aluminium naphthenate, aluminium stearate, calcium linoleate, sodium oleate and zinc stearate.

As thinners for the paint, turpentine and white spirit will generally be used. In certain instances it may be desirable to include a drier such as the naphthenate, rosinate or linoleate salts of lead.

In compounding the paints and paint compositions of this invention, the usual proportions of corrosion-inhibiting pigment, vehicle, extender, suspending agent, and other ingredients, if present, may be used. However as noted, the pigment mixture of this invention may have better corrosion-inhibiting properties, weight-for-weight, then red lead, which leads to the possibiilty of employing smaller quantities of pigment than is usual in primers.

This invention in its application to iron and steel priming paints will be further illustrated in the following example.

EXAMPLE

For comparison purposes both an ilmenite/chromite pigment of this invention and red lead were formulated into a primer having the following identical composition:

FORMULATION OF PRIMER PAINT (A)

| | Percent by weight |
|---|---|
| Ilmenite/chromite pigment | 72.5 |
| Tung oil | 18.5 |
| Boiled linseed oil | 3.0 |
| White spirit | 6.0 |
| | 100.0 |

(B)

| | |
|---|---|
| Red lead (nonsetting) | 72.5 |
| Tung oil | 18.5 |
| Boiled linseed oil | 3.0 |
| White spirit | 6.0 |
| | 100.0 |

The preparation of both primers was carried out in accordance with conventional paint mixing techniques. Each primer was painted (two coats) on a number of mild steel panels which had previously been carefully cleaned, and these panels were subjected to the following "Accelerated Weathering" Tests according to British Standard Specifications.

RESULTS OF SALT DROPLET TESTS (B.S. 1391:1952 PART 2)

| | Ilmenite/chromite | Red lead |
|---|---|---|
| (A) Number of days after start of test when initial failure appeared. | 14 days | 13 days. |
| (B) Number of days to film breakdown and percentage of area of panel rusted. | 60 days (5%) (1,440 hours). | 31 days (100%). (744 hours). |

RESULTS OF C.L.R. SULPHUR DIOXIDE TEST (B.S. 1391:1952 PART 3)

| | | |
|---|---|---|
| (A) Number of days after start of test when initial failure appeared. | 12 days | 3 days. |
| (B) Number of days to film breakdown and percentage of area of panel rusted. | 60 days (5%) (1,440 hours). | 10 days (100%). (240 hours). |

RESULTS OF HUMIDITY TESTS (DEF-1053 METHOD 25)

| | | |
|---|---|---|
| Number of days to film breakdown and percentage of area of panel rusted. | 80 days (No failure *). | 80 days (100%). (1,920 hours). |

* There was no appearance of failure and the test was abandoned on the eightieth day.

N.B.—1,000 hours of accelerated weathering tests are equivalent to approximately three years of normal exposure.

These experiments illustrate the superiority of the paint pigment of the present invention, compared with the conventional red lead.

What is claimed is:
1. A paint pigment composition characterized in that it comprises a mixture of from 25.0% to 75.0% by weight of ilmenite and from 75.0% to 25.0% by weight of chromite, said percentages being based on the total weight of ilmenite and chromite present.

References Cited

UNITED STATES PATENTS

| 1,118,400 | 11/1914 | Dempster | 106—300 UXR |
| 1,251,170 | 12/1917 | Barton | 106—300 |
| 1,662,741 | 3/1928 | Gardner | 106—299 UXR |
| 2,068,294 | 1/1937 | Korinth et al. | 106—299 UXR |

FOREIGN PATENTS

| 209,366 | 1/1924 | Great Britain | 106—299 |

OTHER REFERENCES

Chemical Abstracts, vol 52, p. 9872g (1958).
Chemical Abstracts, vol. 57, p. 450a (1962).
Chemical Abstracts, vol. 57, p. 6900g (1962).

TOBIAS E. LEVOW, Primary Examiner

H. M. S. SNEED, Assistant Examiner

U.S. Cl. X.R.

106—228, 253, 300, 302; 260—2.5, 37, 38, 69